(12) United States Patent
O'Shaughnessy et al.

(10) Patent No.: US 12,103,837 B2
(45) Date of Patent: Oct. 1, 2024

(54) GAS TANK ATTACHMENT FOR A TRUCK MOUNTED FORKLIFT

(71) Applicant: Cargotec Engineering Ireland Limited, Dundalk (IE)

(72) Inventors: Shaun Paul O'Shaughnessy, Dundalk (IE); Sean Fanning, Navan (IE)

(73) Assignee: CARGOTEC ENGINEERING IRELAND LIMITED, Dundalk (IE)

( * ) Notice: Subject to any disclaimer, the term of this patent is extended or adjusted under 35 U.S.C. 154(b) by 634 days.

(21) Appl. No.: 17/200,462

(22) Filed: Mar. 12, 2021

(65) Prior Publication Data
US 2022/0002127 A1    Jan. 6, 2022

(30) Foreign Application Priority Data
Mar. 12, 2020    (GB) ...................................... 2003613

(51) Int. Cl.
*B66F 9/18*    (2006.01)
*B62B 3/10*    (2006.01)

(52) U.S. Cl.
CPC .............. *B66F 9/187* (2013.01); *B62B 3/104* (2013.01)

(58) Field of Classification Search
CPC ............. B66F 9/187; B66F 9/184; B66F 9/18
See application file for complete search history.

(56) References Cited

U.S. PATENT DOCUMENTS

| | | | | |
|---|---|---|---|---|
| 2,997,193 A * | 8/1961 | Dunham | ................... | B66F 9/18 414/622 |
| 3,126,223 A * | 3/1964 | Kughler | ................... | B66F 9/184 414/622 |
| 3,164,405 A * | 1/1965 | Lull | .......................... | B66F 9/18 414/622 |
| 3,449,009 A * | 6/1969 | Faust | ....................... | B66F 9/184 294/104 |
| 3,817,567 A * | 6/1974 | Lull | .......................... | B66F 9/18 294/197 |
| 4,106,646 A * | 8/1978 | Weisgerber | ............. | B66C 1/585 294/201 |
| 4,266,819 A * | 5/1981 | Pemberton | ................ | B66F 9/18 294/197 |

(Continued)

*Primary Examiner* — Jonathan Snelting
(74) *Attorney, Agent, or Firm* — Brian J. Colandreo; Jeffrey T. Placker; Holland & Knight LLP

(57) ABSTRACT

This invention relates to a gas tank handling attachment for a truck mounted forklift truck (TMFL) comprising a frame, a pair of clamping arms pivotably mounted on the frame, and a pair of pivoting rams mounted on the frame, operable to pivot the clamping arms to and from a stowed configuration and an operating configuration. The frame comprises a pair of spaced apart uprights bridged by a bracing crossmember, and there is provided, mounted on the frame, means to releasably engage a fork carriage. One of the clamping arms is mounted on one upright and the other clamping arm is mounted on the other upright. In the stowed configuration, the clamping arms are substantially parallel to and extend upwardly from the uprights, and in the operating configuration the clamping arms are substantially orthogonal to and project forwardly from the uprights. An operator can operate the attachment to engage/disengage a gas tank from inside the driver's station of the TMFL.

20 Claims, 15 Drawing Sheets

(56) References Cited

U.S. PATENT DOCUMENTS

| | | | | |
|---|---|---|---|---|
| 4,459,080 A | * | 7/1984 | Walter | B66F 9/18 |
| | | | | 414/661 |
| 4,529,239 A | * | 7/1985 | Ogawa | B66F 9/18 |
| | | | | 294/197 |
| 4,659,277 A | * | 4/1987 | Widener | B66F 9/18 |
| | | | | 294/197 |
| 5,518,359 A | * | 5/1996 | Pratt | B66F 9/18 |
| | | | | 414/664 |
| 6,729,832 B1 | * | 5/2004 | Word, III | B66F 9/0655 |
| | | | | 37/406 |

* cited by examiner

GAS TANK ATTACHMENT FOR A TRUCK MOUNTED FORKLIFT

RELATED APPLICATIONS

This Application is based on and claims the benefit of priority from Great Britain Patent Application No. 2003613.3, filed on 12 Mar. 2020, the entire disclosure of which is incorporated herein by reference.

TECHNICAL FIELD OF THE INVENTION

This invention relates to a gas tank handling attachment for a truck mounted forklift truck. More specifically, this invention relates to a gas tank handling attachment for mounting on the lifting assembly of a truck mounted forklift (TMFL).

BACKGROUND OF THE INVENTION

Gas tanks are commonly used in both domestic and commercial premises. The gas tanks typically contain liquefied petroleum gas (LPG), otherwise referred to as liquid propane gas, or other suitable gas that is used for example by the central heating system and/or cooking appliance of the premises. The gas tanks come in a range of different sizes including 250, 500 and 1000 Gallon tanks. In order to deliver a gas tank from a manufacturing facility to a distributor, or to install a gas tank on site at a customer's premises, a truck loader crane is typically used to lift the gas tank off of a delivery vehicle and place it in position at the delivery destination.

Unfortunately, the use of a truck loader crane often restricts where the gas tank may be positioned on site, particularly when delivering to a customer's premises. When delivering to a customer's or distributor's premises, this problem may be overcome by using a hauling device such as the EZ-HD (Registered Trade Mark)®, as sold by G.D. Roberts Company, Inc.® (Trading as Fisk Tank Carriers) of Columbus, Wisconsin, United States of America, the YankATank®, as sold by Move It Inc.® of Basin City, Washington, United States of America, or the EZTC206® as sold by Renaldo Sales & Service, Inc.® of North Collins, New York, United States of America. However, this requires two separate lifting operations, unloading the tank from the vehicle and thereafter loading and unloading the tank on the hauling device which is time consuming and inefficient. Furthermore, the hauling device may not be readily available for deliveries to customer's premises and may not be available at the distributor's premises.

It is highly advantageous if a forklift truck, and more specifically a piggyback forklift truck which is a particular type of lightweight forklift truck that is transported from premises to premises on the rear of a carrying vehicle, could be used to install the gas tank. This allows far greater freedom in positioning the gas tank on site. However, at present, it is not possible to use a standard forklift truck for this purpose. This is due to the fact that the tank has a tendency to roll away from the forklift truck when the gas tank is lifted on the tines. As will be readily understood, this can be extremely dangerous.

One gas tank handling attachment for a truck mounted forklift that addressed this problem, at least in part, was the gas tank handling device disclosed in US Patent Application Publication No. US2013/0259618 (assigned to the applicant). US2013/0259618 discloses a fork carriage with forks that could be splayed apart from each other or moved towards each other on the fork carriage through operation of a ram. The forks could be used to push against the legs of the gas tank and provide a frictional force to hold the gas tank in position on the forks. This was not entirely satisfactory as this could cause damage to the legs of the gas tank and could not always provide a sufficiently secure engagement of the gas tank. Extension pieces were provided to allow a more secure engagement of the gas tank legs and accommodate different sizes of gas tank however these were not without shortcomings either. For example, the extension pieces only worked on specific configurations of gas tank legs and in order to adjust the extension pieces to accommodate different sized gas tanks, the operator of the TMFL would have to alight from the TMFL and manually adjust the extension pieces to accommodate the differently sized gas tanks. This was time consuming and inconvenient. Chinese Utility Model Patent No. CN205933105U in the name of Anqing Liandong Eng discloses a pipe clamp for a forklift truck. Chinese Utility Model Patent No. CN208829197U in the name of Sichuan Huida Pipe Ind discloses a pipe clamp for a lifting vehicle.

It is further known to use various clamp arrangements and other fixing members to secure awkward loads in position on the tines of a forklift however the known clamps and fixing members are unsuitable for use with gas tanks. The presence of vent caps and the like on the gas tank limit the use of the known overhead clamp as the clamp would have a tendency to cause damage to those parts of the gas tank. The option of under-slinging the tank on the tines is not available as the gas tank secured in such a manner will have a tendency to damage the mast of the forklift.

It is an object of the present invention to provide a gas tank handling attachment that will overcome at least some of these difficulties. It is a further object of the present invention to enable a forklift truck to be used in the placement of a gas tank. It is a further still object of the present invention to provide a useful alternative choice for the consumer.

SUMMARY OF THE INVENTION

According to the invention there is provided a gas tank handling attachment for a truck mounted forklift truck (TMFL) comprising:
  a frame comprising a pair of spaced apart uprights bridged by at least one bracing cross-member therebetween, and means to releasably engage a fork carriage mounted on the frame;
  a pair of clamping arms pivotably mounted on the frame, one of which is mounted on the first of the pair of spaced apart uprights and the other of which is mounted on the second of the pair of spaced apart uprights, the pair of clamping arms being pivotable to and from a first stowed configuration in which the clamping arms are substantially parallel to and extend upwardly from the uprights and a second operating configuration in which the clamping arms are substantially orthogonal to and project forwardly from the uprights;
  a pair of pivoting rams mounted on the frame, one of the pivoting rams being operable to pivot the first clamping arm to and from the stowed configuration and the operating configuration, the other of the pivoting rams being operable to pivot the second clamping arm to and from the stowed configuration and the operating configuration.

By having such a gas tank handling attachment, a TMFL may be used to place the gas tank in the desired location at the customer's or distributor's premises and it is not limited by the shortcomings of a truck loader crane solution. Furthermore, there will no longer be the need for two separate lifting operations as the forklift truck may pick the gas tank up from the delivery vehicle and place the gas tank down in the desired location using only the forklift. In addition, the configuration of gas tank handling attachment can be used to provide a secure grip on the gas tank without damaging the vent caps or other parts of the gas tank. Finally, another advantage of the gas tank handling attachment according to the invention is that it may be retrofit to existing TMFLs and may be removed from the TMFL when not in use, thereby reducing the weight of the TMFL when it is being used for other operations. However, the gas tank handling attachment does not have to be removed for normal operation of the truck mounted forklift if preferred and advantageously, due to the configuration of the clamping arms in a stowed configuration, the TMFL can be mounted onto a carrying vehicle without having to remove the attachment.

In one embodiment of the invention there is provided a gas tank handling attachment in which each of the clamping arms is cranked intermediate its ends in an elbow joint. By having the clamping arms cranked intermediate their ends in an elbow joint, this will provide for a clamping arm that can more securely engage gas tanks of different sizes, in particular, gas tanks of different diameters. By having a cranked arm, the arm can extend partially around gas tanks of narrower diameters. In addition, the cranked arm allows for clearance around fittings on the top of the tank.

In one embodiment of the invention there is provided a gas tank handling attachment in which each of the clamping arms is provided with a clamping pad pivotably mounted at its outermost, free end remote from the frame. Again, this will provide for a clamping arm that can more securely engage the gas tank. The clamping pad pivotably mounted at the outermost free end of the clamping arm will be able to more closely align itself with the outer surface of the gas tank and provide a more secure engagement.

In one embodiment of the invention there is provided a gas tank handling attachment in which the clamping pad is substantially arcuate in shape. By having a clamping pad that is arcuate in shape, the clamping pad will have a tendency to engage the gas tank in at least two separate, spaced apart points around the circumference of the gas tank. This will ensure a more secure engagement of the gas tank by the gas tank handling attachment.

In one embodiment of the invention there is provided a gas tank handling attachment in which the clamping pad is provided with a rubber cover for engagement of the gas tank. The rubber cover will obviate the possibility of the clamping pad causing damage to the gas tank as it clamps the gas tank in position on the tines.

In one embodiment of the invention there is provided a gas tank handling attachment in which the frame comprises a pair of tine pockets mounted on the bracing cross member. This is seen as a particularly useful aspect of the present invention. By having tine pockets, another forklift may be used to remove the gas tank handling attachment off the fork carriage by inserting the tines of the second forklift into the tine pockets and lifting the gas tank handling attachment off the fork carriage. Alternatively, it is envisaged that a free-standing mounting bracket could be used by inserting the arms of the free-standing mounting bracket into the tine pockets and lowering the fork carriage of the fork lift to remove the gas tank handling attachment from the TMFL.

In one embodiment of the invention there is provided a gas tank handling attachment in which the means to engage the fork carriage comprises a quick-hitch attachment.

In one embodiment of the invention there is provided a gas tank handling attachment in which the pivoting rams are hydraulic rams and in which the gas tank handling attachment comprises a hydraulic connector for receipt of and connection to a hydraulic supply and return feed of a TMFL.

In one embodiment of the invention there is provided a gas tank handling attachment in which there is provided a flow divider directly downstream of the hydraulic connector intermediate the hydraulic connector and the pivoting rams for controlling the supply of hydraulic fluid from the hydraulic supply feed to the pivoting rams. By having a flow divider, the two pivoting arms may be synchronized to open and close simultaneously, thereby providing more secure engagement and handling of the gas tank.

In one embodiment of the invention there is provided a gas tank handling attachment in which there is provided a check valve on each of the pivoting rams. This is seen as a particularly preferred aspect of the present invention that will prevent inadvertent release of the gas tank handling attachment from the gas tank. The check valve will provide pressure control and will prevent loss of load and depressurization.

In one embodiment of the invention there is provided a gas tank handling attachment in which there is provided a rubber pad on each of the uprights. Again, by having a rubber pad on the upright, this will reduce the likelihood of causing damage to the upright, the mast and/or the gas tank.

In one embodiment of the invention there is provided a gas tank handling attachment in which there are provided a pair of tine rubber pads, each of which is configured for mounting on a tine of a TMFL. The tine rubber pads may have magnets incorporated therein to allow fast attachment/removal of the rubber pads to the tines.

In one embodiment of the invention there is provided a truck mounted forklift (TMFL) comprising a u-shaped chassis having a pair of side bars bridged by a rear cross bar, a driver's station mounted on one of the side bars, a motive power unit mounted on the other side bar opposite the driver's station, and a lifting assembly mounted on the u-shaped chassis comprising a fork carriage and a pair of forks mounted on the fork carriage, means to extend and retract the reach of the forks, and in which there is provided a gas tank handling attachment according to the invention mounted on the fork carriage.

This is seen as a particularly suitable machine for maneuvering a gas tank at a customer's premises or at a distributor's premises. The TMFL can be used to pick the gas tank up off a carrying delivery vehicle and place the gas tank down in the desired location without the need for two separate lifts or alternative equipment. The TMFL may be used to safely maneuver the gas tank without fear of damaging the gas tank. In addition, the TMFL can also be used to place the tank below ground level, which the current mobile solutions cannot do. In those cases, a crane is required to position the tank.

In one embodiment of the invention there is provided a TMFL in which the lifting assembly comprises a substantially upright mast and in which the fork carriage is configured for reciprocal movement upwards and downwards on the substantially upright mast. If desired, the upright mast may be mounted on a slidable carriage, slidable forwards and backwards along the chassis.

In one embodiment of the invention there is provided a TMFL in which the substantially upright mast is pivotably mounted on the chassis and in which there is provided a tilt ram, one end of which is mounted on the chassis and the other end of which is connected to the substantially upright mast, operable to tilt the substantially upright mast. If the mast is on a carriage, one end of the tilt ram will be connected to the carriage and the other end of the tilt ram will be connected to the substantially upright mast.

In one embodiment of the invention there is provided a TMFL in which the means to extend and retract the reach of the forks comprises a pantograph device on which the fork carriage is mounted.

In one embodiment of the invention there is provided a TMFL in which there is provided a hydraulic supply feed for connection to a hydraulic connector of the gas tank handling attachment.

In one embodiment of the invention there is provided a TMFL in which there are provided controls internal the driver's station for operating the pivoting rams of the gas tank handling attachment. In this way, the driver of the TMFL may operate the gas tank handing attachment from their driver's station and they will not have to alight from their vehicle during the picking up or placing down of the gas tank. In addition, this arrangement will allow the operation of engaging and disengaging the tank to be performed by a single operator.

BRIEF DESCRIPTION OF THE DRAWINGS

The invention will now be more clearly understood from the following description of some embodiments thereof given by way of example only with reference to the accompanying drawings, in which.

DETAILED DESCRIPTION OF THE INVENTION

Figure 1:
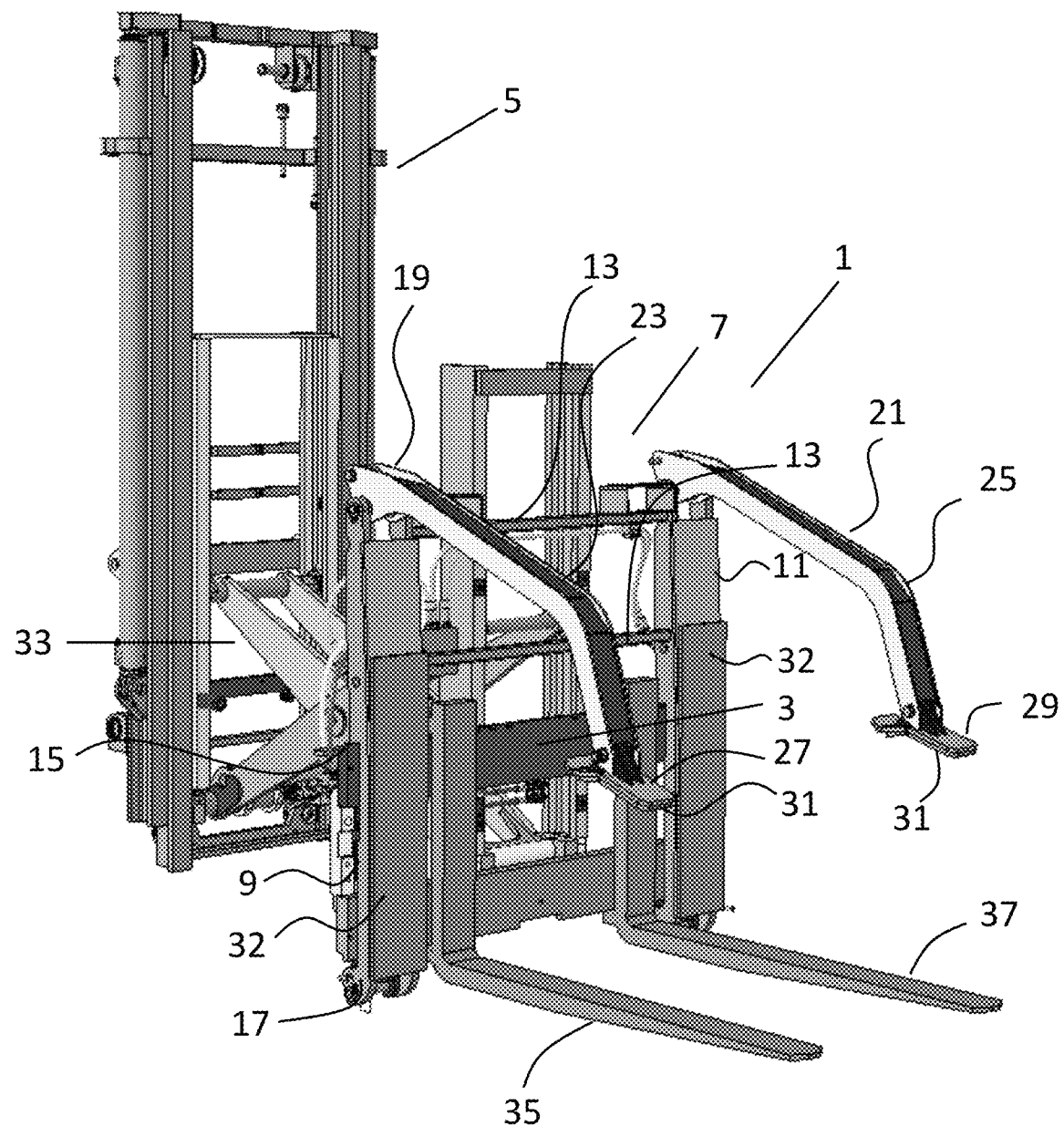
FIG. 1 is a diagrammatic representation of a gas tank handling attachment according to the invention mounted on an upright mast.

Referring to FIG. 1, there is shown a gas tank handling attachment according to the invention, indicated generally by the reference numeral 1, mounted on the fork carriage 3 of an upright mast 5. The gas tank handling attachment 1 comprises a frame 7 comprising a pair of spaced apart uprights 9, 11 bridged by a bracing cross-member 13 therebetween. In the embodiment shown, there are two bracing cross members 13. There is further provided means, in this case a quick hitch attachment, 15, 17 to releasably engage the fork carriage 3, mounted on the frame 7.

The gas tank handling attachment further comprises a pair of clamping arms 19, 21 pivotably mounted on the frame 7. One of the clamping arms 19 is mounted on the first of the pair of spaced apart uprights 9 and the other of the clamping arms 21 is mounted on the second of the pair of spaced apart uprights 11. The pair of clamping arms 19, 21 are pivotable to and from a first stowed configuration in which the clamping arms are substantially parallel to and extend upwardly from the uprights 9, 11, and a second operating configuration (as shown) in which the clamping arms 19, 21 are substantially orthogonal to and project forwardly from the uprights 9, 11. A pair of pivoting rams (not shown) are mounted on the frame, one being operable to pivot the first clamping arm 19 to and from the stowed configuration and the operating configuration, and the other pivoting ram being operable to pivot the second clamping arm to and from the stowed configuration and the operating configuration.

It can be seen that the clamping arms 19, 21 are cranked intermediate their ends in elbow joints 23, 25 and each of the clamping arms 19, 21 is provided with a clamping pad 27, 29 pivotably mounted at its outermost, free end remote from the frame. The clamping pads 27, 29 are substantially arcuate-shaped to match the circumference of a gas tank (not shown). Rubber buffer pads 31 are provided on the clamping pads 27, 29 and the uprights 9, 11 to prevent damage to the gas tank.

The upright mast 5 comprises a pantograph arrangement 33 for extending the reach of the pair of forks 35, 37 mounted on the fork carriage. The pantograph arrangement 33 and the fork carriage 3 may be moved up and down the upright mast 5 in a manner generally understood in the art that is not necessary to further elaborate upon here.

Figure 2:
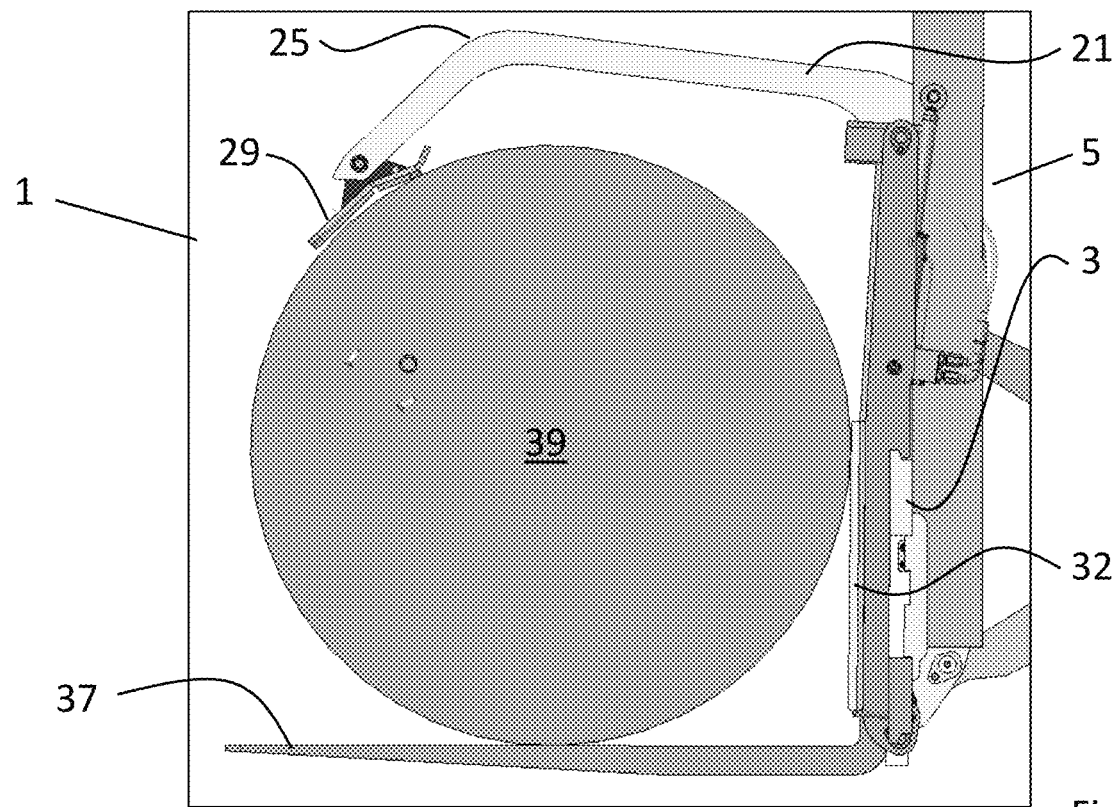
FIG. 2 is a side view of the gas tank handling attachment engaging a first gas tank.
Figure 3:
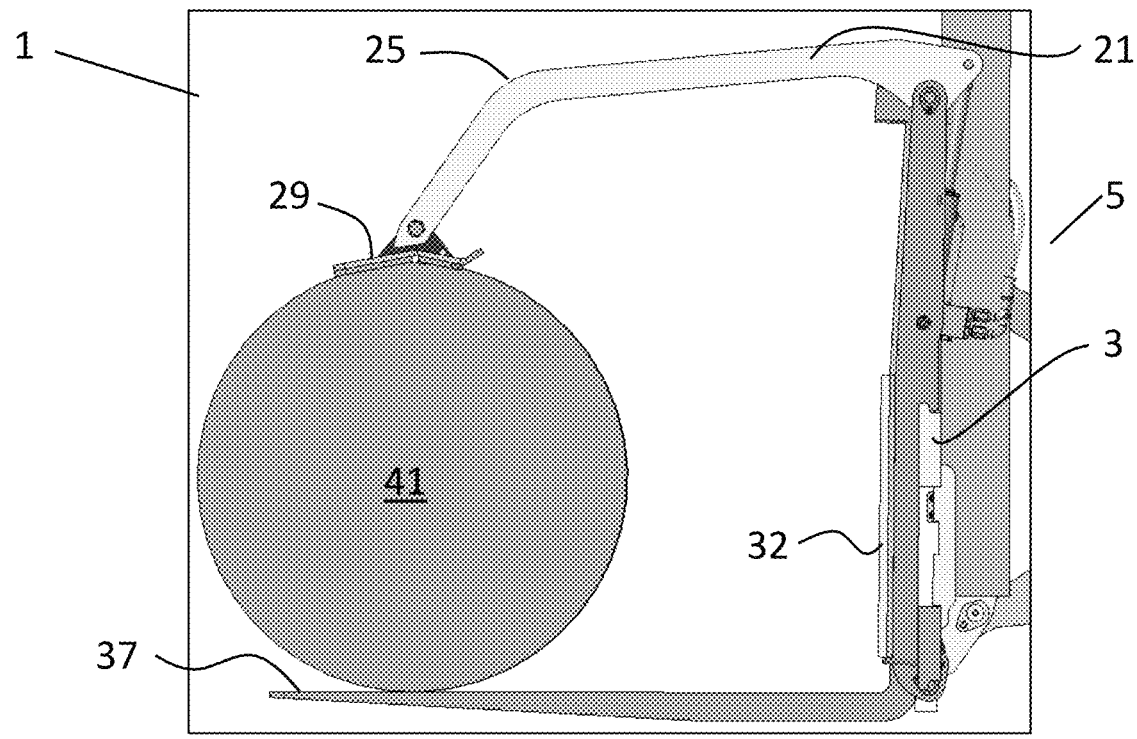
FIG. 3 is a side view of the gas tank handling attachment engaging a second gas tank.

Referring now to FIGS. 2 and 3, there is shown the gas tank handling attachment 1 engaging a pair of gas tanks, 39, 41 respectively, of differing diameter. In FIG. 2, the gas tank handling attachment is shown engaging a larger, 1000 gallon tank. The gas tank extends all the way rearwards to the rubber buffer pads 32 on the upright faces of the tines 35, 37. The clamping arms 19, 21 have been pivoted so that the main portions of the arms before the elbow joints 23, 25 are almost parallel with the ground and almost perpendicular to the upright mast 5. The clamping pads 27, 29 pivot around their pivot joint to closely match the circumference of the gas tank 39. The geometry and weighting of the feet are designed to assist with constant/predictable contact of said feet to the tank to prevent scoring.

Referring specifically to FIG. 3, the gas tank handling attachment is shown engaging a smaller, 500 gallon tank 41. The tank 41 sits on the outer end of the tines 35, 37 and rubber pads (not shown) may be provided on the tines to avoid damage to the gas tank and to promote better grip of the gas tank on the tines 35, 37. The clamping arms 19, 21 have been pivoted so that the main portions of the arms before the elbow joints 23, 25 have gone through parallel with the ground and through the point where they were perpendicular with the upright mast 5. The clamping pads 27, 29 have again pivoted around their pivot joint to closely match the circumference of the gas tank 39.

Figure 4:
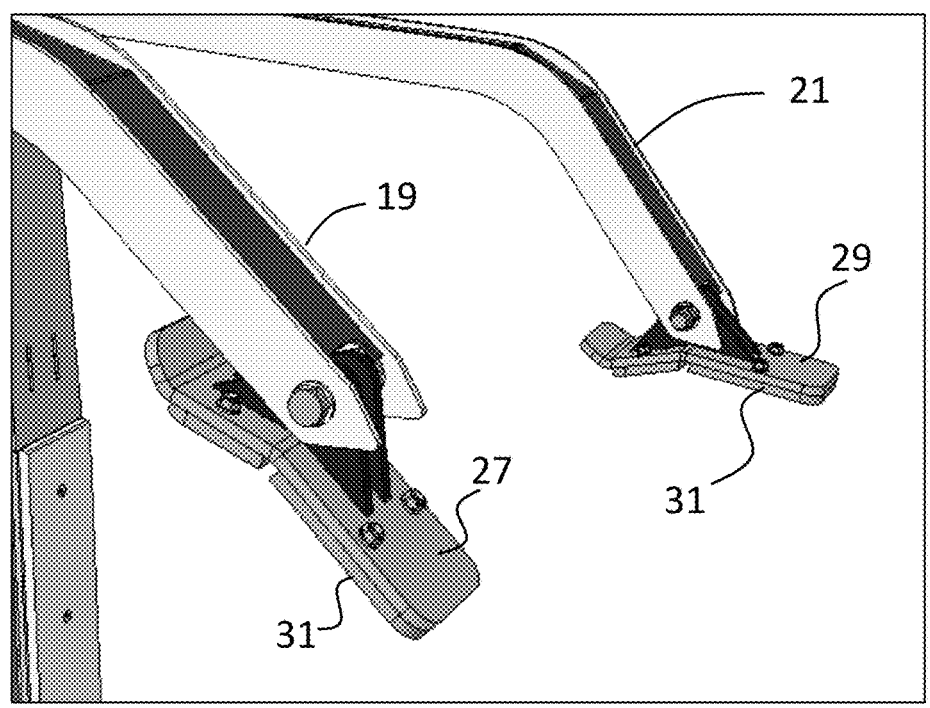
FIG. 4 is an enlarged view of the clamping pads of the gas tank handling attachment.

Referring to FIG. 4, there is shown an enlarged view of the clamping pads 27, 29 mounted on the outer, free end of the clamping arms 19, 21. In the drawing, the clamping pads 27, 29 have pivoted about their pivot joints to differing degrees to illustrate some of the range of movement of the clamping pads 27, 29 about the pivot joints.

Figure 5:
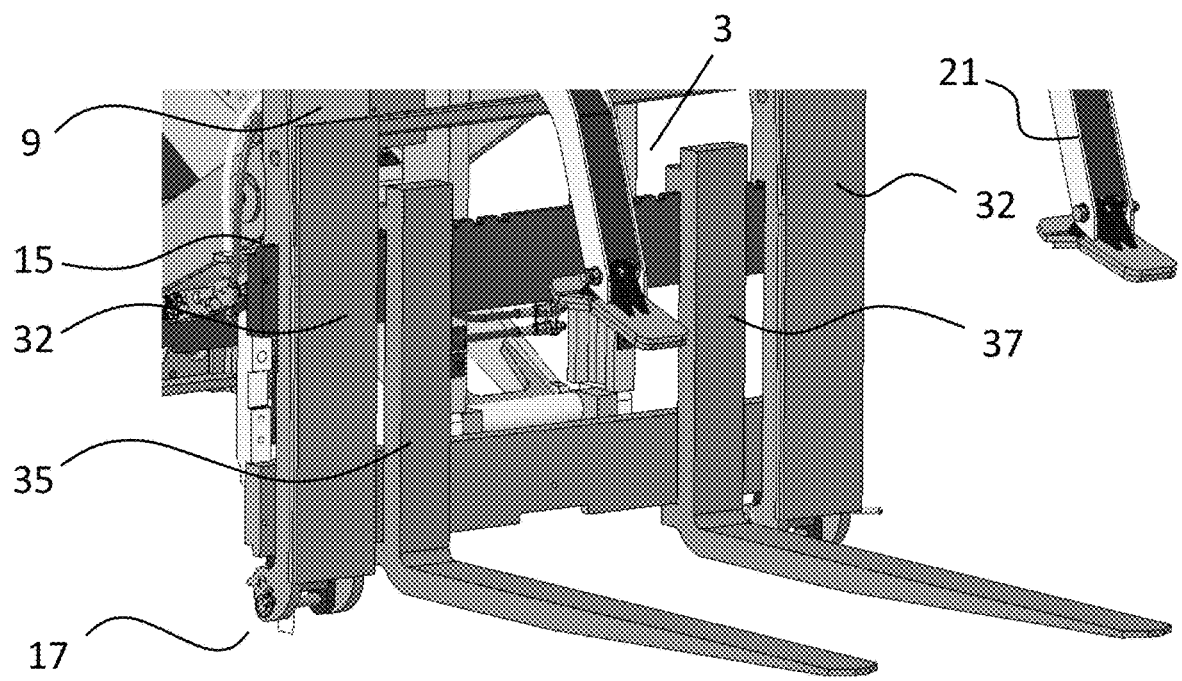
FIG. 5 is an enlarged view of the uprights of the gas tank handling apparatus.

Referring to FIG. 5, there is shown an enlarged view of the fork carriage 3 with the gas tank handling attachment 1 mounted thereon. The rubber buffer pads 32 on the uprights 9, 11 are clearly visible. Furthermore, the quick hitch attachments 15, 17 are apparent.

Figure 6:
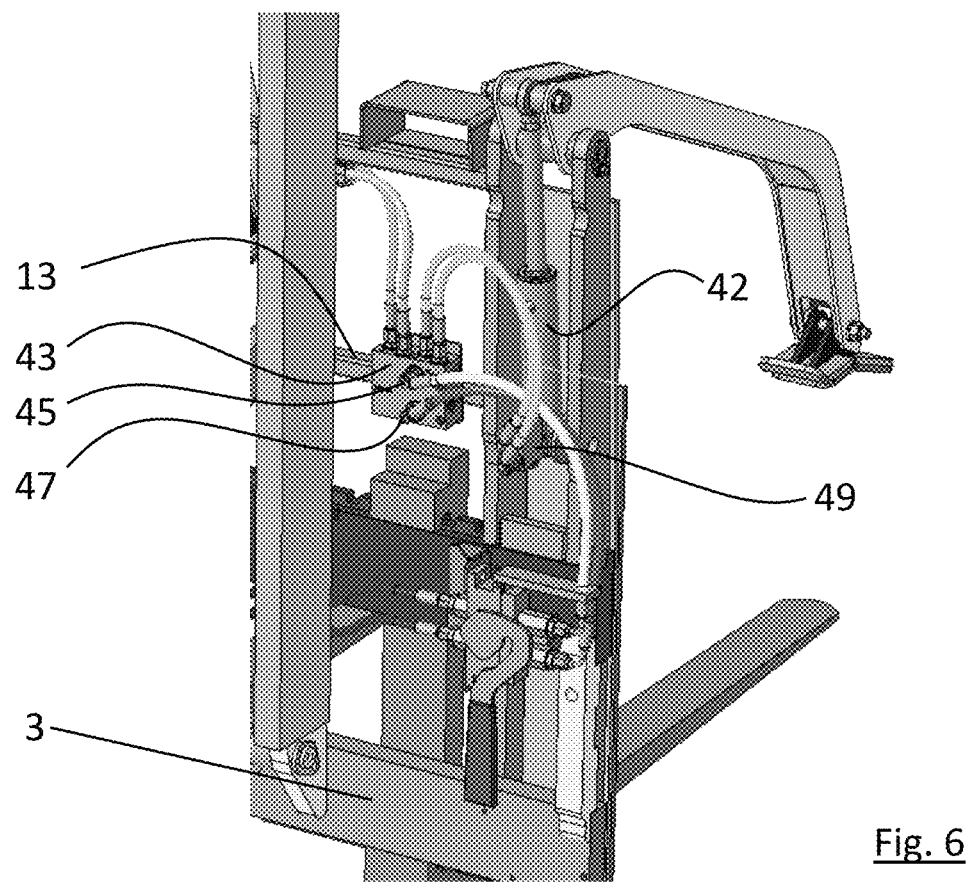
FIG. 6 is an enlarged view of the flow divider and hydraulic supply lines of the gas tank handling apparatus.
Figure 7:
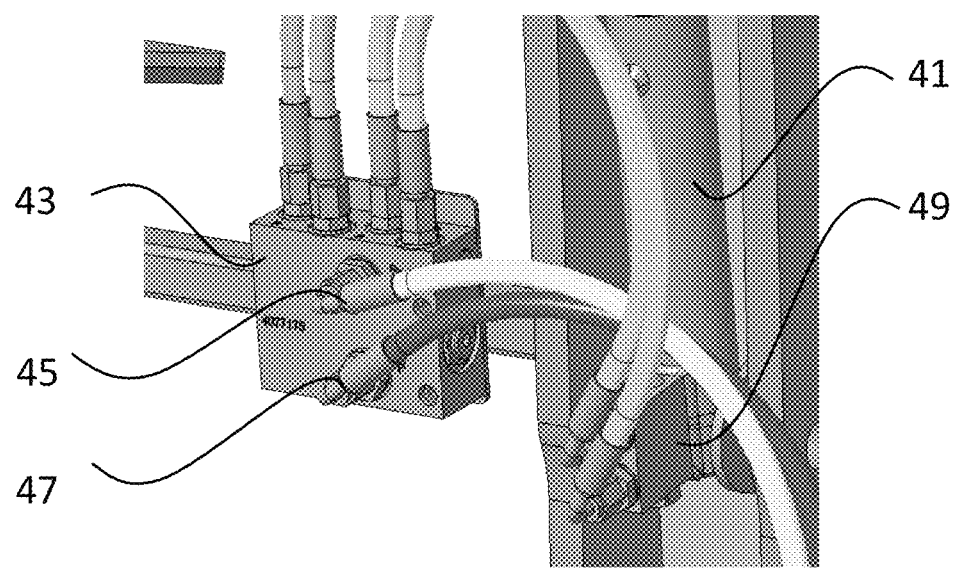
FIG. 7 is another enlarged view of the flow divider and hydraulic supply lines of the gas tank handling apparatus.

Referring now to FIGS. 6 and 7, there are shown rear views of portion of the fork carriage 3 with the gas tank handling attachment 1 mounted thereon. In particular, one of the pivoting rams 42 is visible along with the hydraulic attachment to the hydraulics of the TMFL. The gas tank handling attachment 1 comprises a hydraulic connector 43 for receipt of and connection to a hydraulic supply 45 and return 47 feed of a TMFL. Preferably, the hydraulic connector is a quick disconnect fitting. The hydraulic connector 43 further comprises a flow divider for delivering hydraulic fluid simultaneously to both of the pivoting rams 42. In-line restriction is provided to further improve the synchronization of the arm movement and speed. There is further provided a check valve 49 on the hydraulic lines to the pivoting ram to prevent sudden loss of hydraulic fluid pressure. The pivoting rams 42 are double acting rams.

Figure 8:
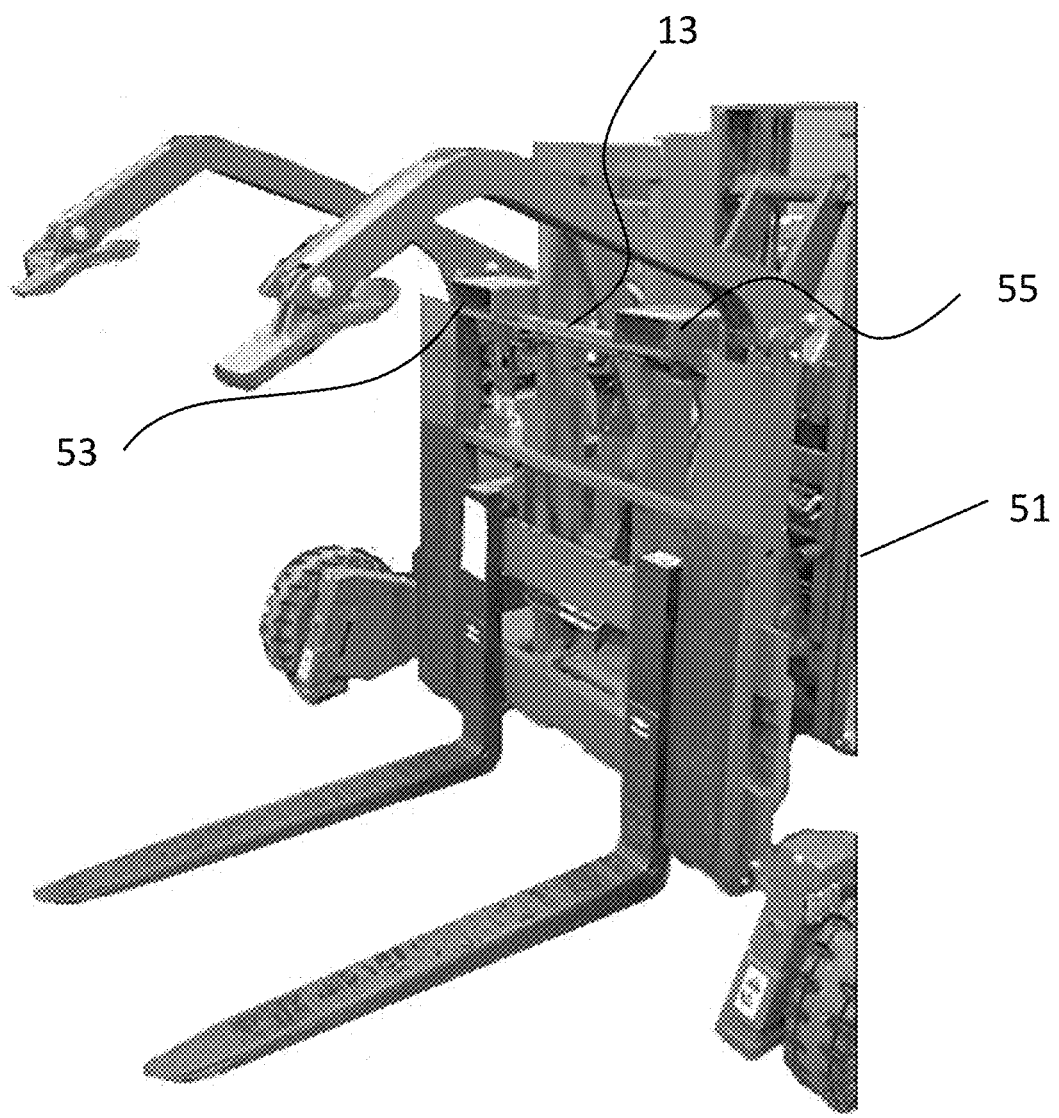
FIG. 8 is a photograph of the gas tank handling attachment mounted on a truck mounted forklift (TMFL)

Referring now to FIG. 8, there is shown the gas tank handling attachment mounted on the fork carriage 3 of an upright mast 5 which in turn is mounted on a truck mounted forklift (TMFL) truck 51. It can be seen that the gas tank handling attachment has a pair of fork pockets 53, 55 (otherwise referred to as tine pockets) on the bracing crossmember 13. Their functionality will be described below with reference to FIGS. 11(a) to 11(f) inclusive.

Referring now to FIGS. 9(a) to 9(j) inclusive, there are shown a number of views of a TMFL 51 with the gas tank handling attachment 1 mounted thereon picking up a gas tank 39. The TMFL comprises a u-shaped chassis having a pair of side bars bridged by a rear cross bar, a driver's station 57 mounted on one of the side bars, a motive power unit 59 mounted on the other side bar opposite the driver's station, and a lifting assembly 5 mounted on the u-shaped chassis comprising an upright mast, a fork carriage 3 mounted on the upright mast, a pair of forks 35, 37 mounted on the fork carriage 3, and a pantograph 33 to alter the reach of the forks. Instead of or in addition to a pantograph arrangement, the mast could be mounted on a mast carriage, slidable forwards and backwards along the U-shaped chassis, in order to alter the reach of the forks.

Figure 9A:
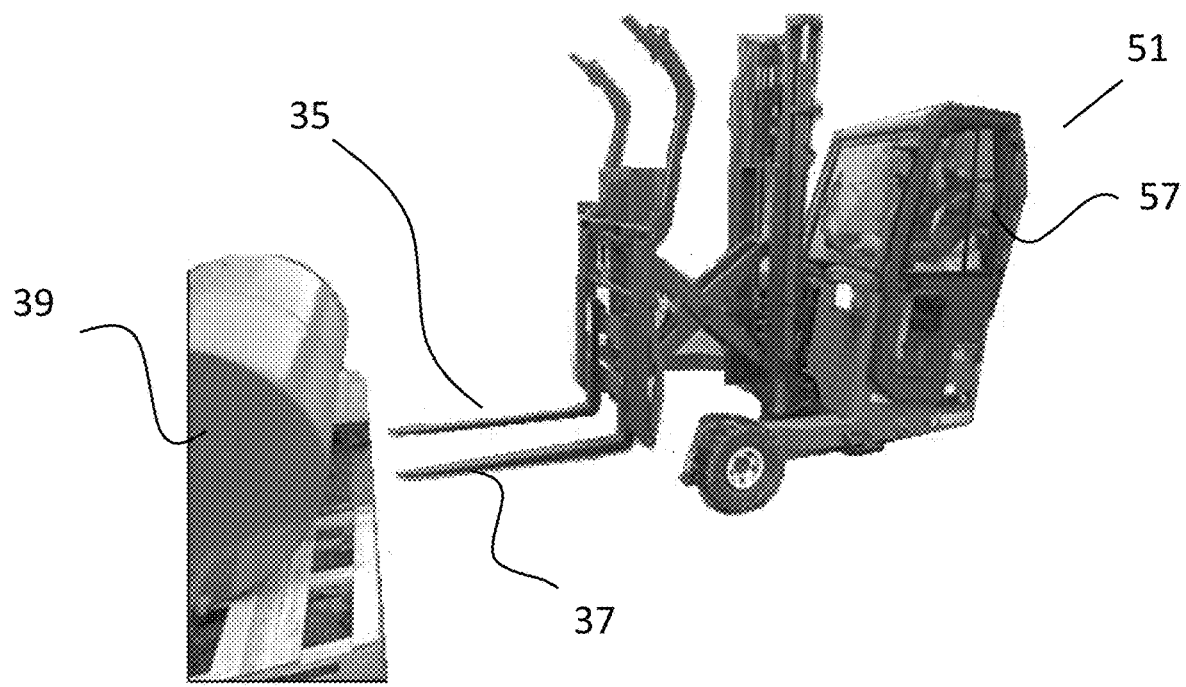
FIGS. 9(a) to 9(j) inclusive are photographs of a TMFL with the gas tank handling attachment according to the invention, in use, handling a gas tank.
Figure 9B:
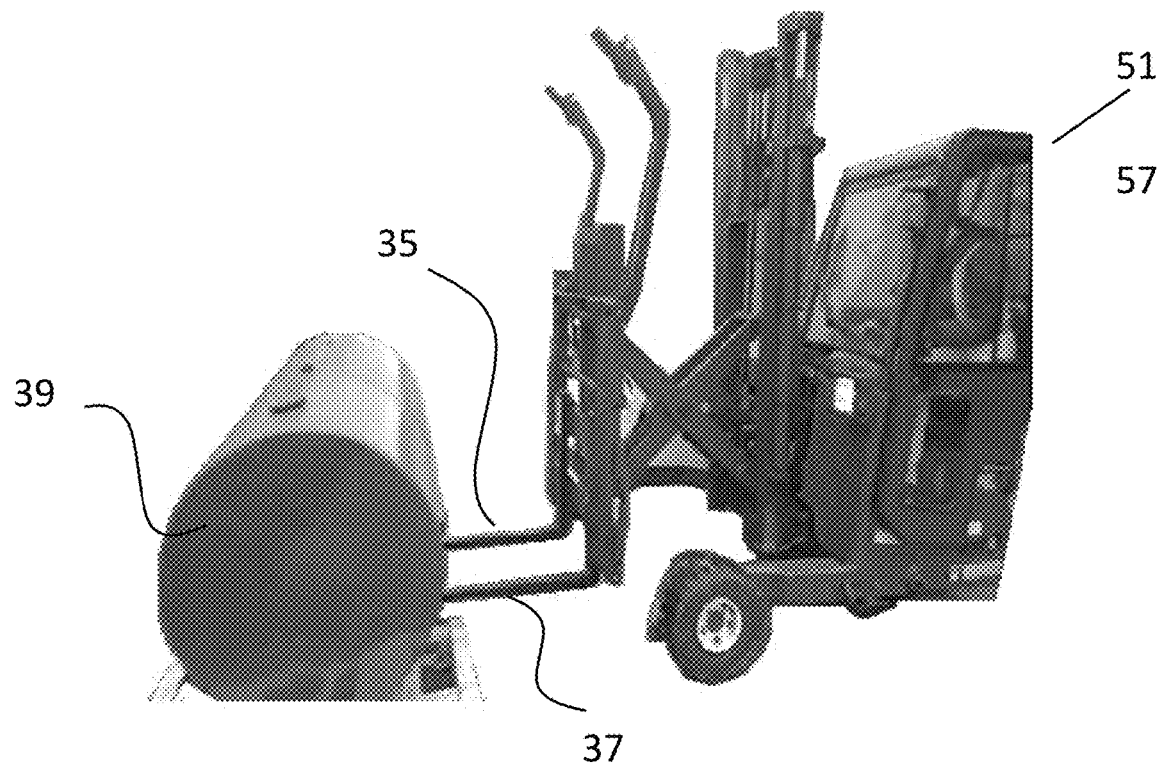
Figure 9C:
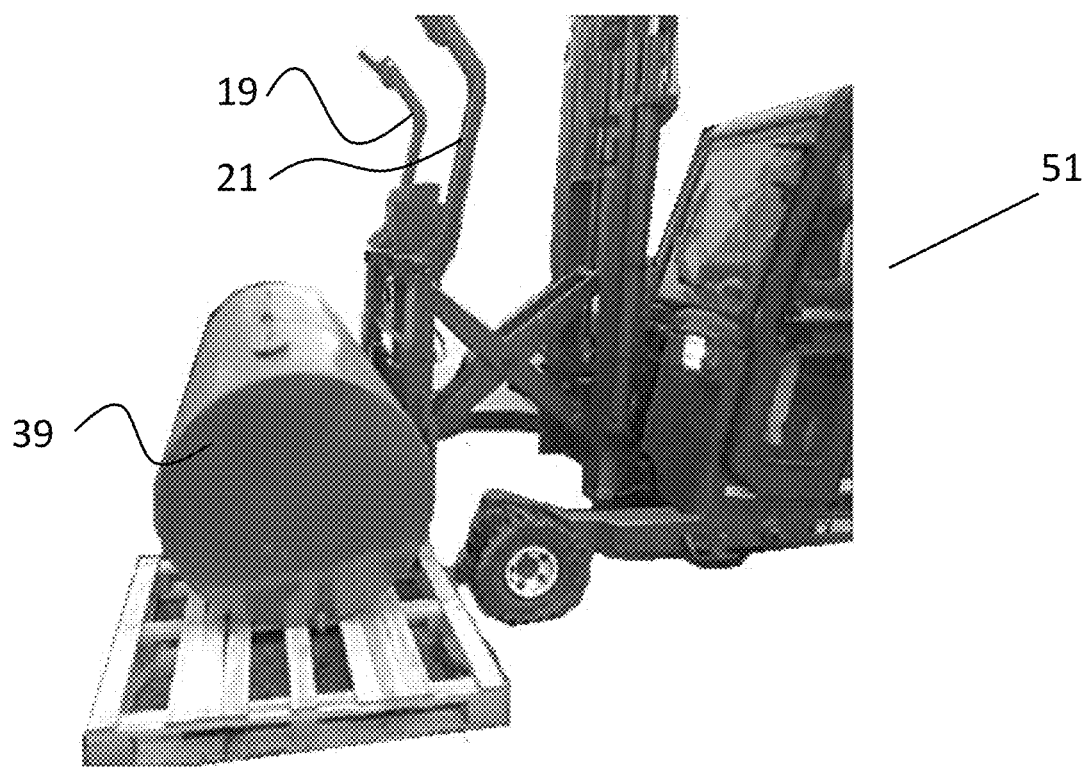
Figure 9D:
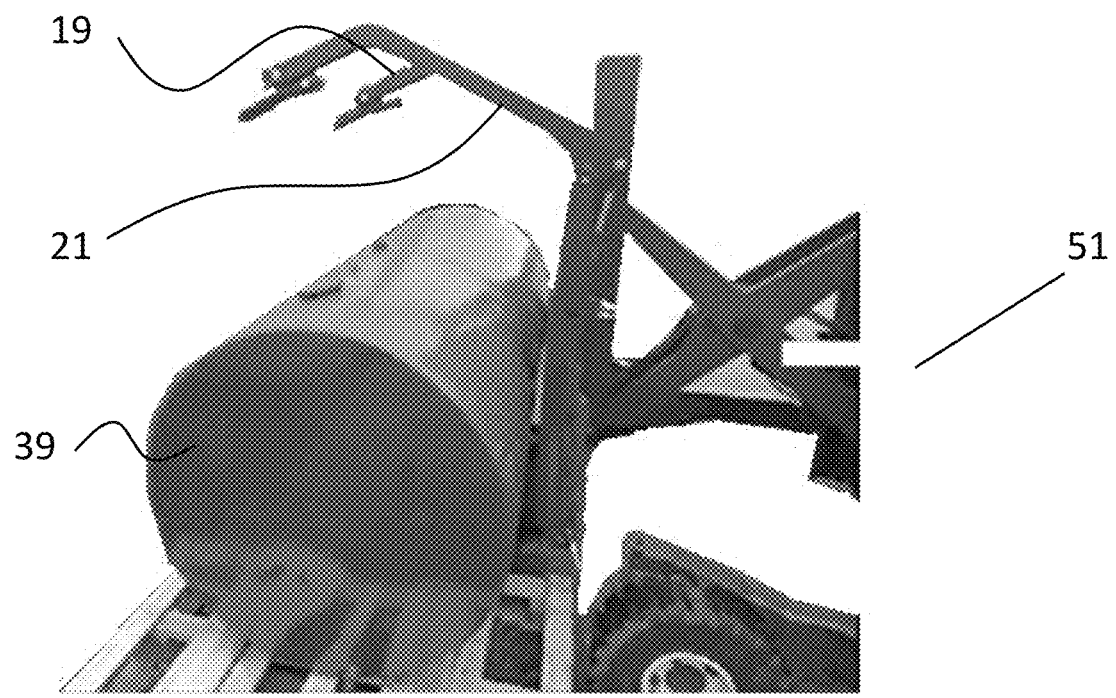
Figure 9E:
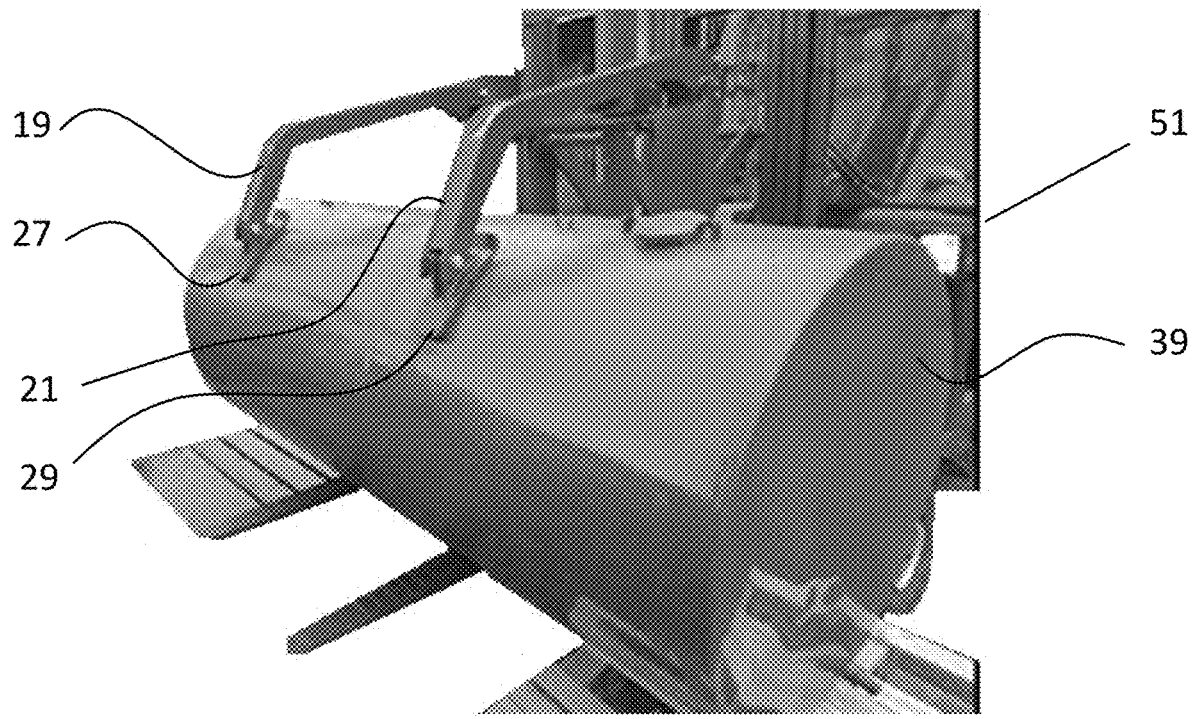
Figure 9F:
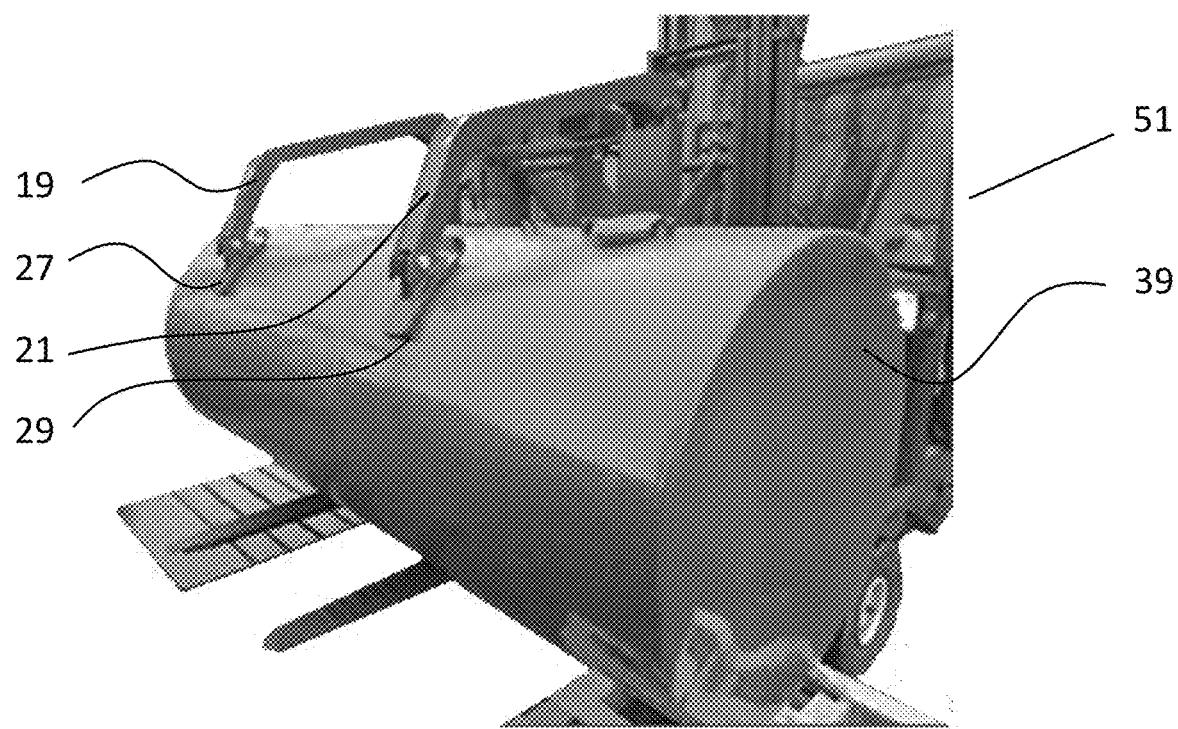

Referring specifically to FIG. 9(a), the operator of the TMFL drives the forklift up to the gas tank 39 and lowers the forks 35, 37 so that they can travel underneath the gas tank. In FIG. 9(b), the forklift is advanced further to place the forks 35, 37 underneath the gas tank 39. In FIG. 9(c), the forklift is advanced even further still until the forks are fully underneath the gas tank. It will be noted that in this position, and in the preceding positions in FIG. 9(a) and FIG. 9(b), the pivoting clamping arms 19, 21 are configured so that they are essentially parallel to the uprights 9, 11. In FIG. 9(d), the operator actuates the pivoting rams 42 and this causes the clamping arms 19, 21 to pivot downwardly towards the gas tank until the clamping pads 27, 29 are in engagement with the gas tank as shown in FIG. 9(e). Once the gas tank has been captured between the clamping pads 27, 29 and the forks 35, 37, the forks may be raised by operating the lifting assembly as shown in FIG. 9(f). The weight of the gas tank 39 is now being carried by the TMFL 51.

Figure 9G:
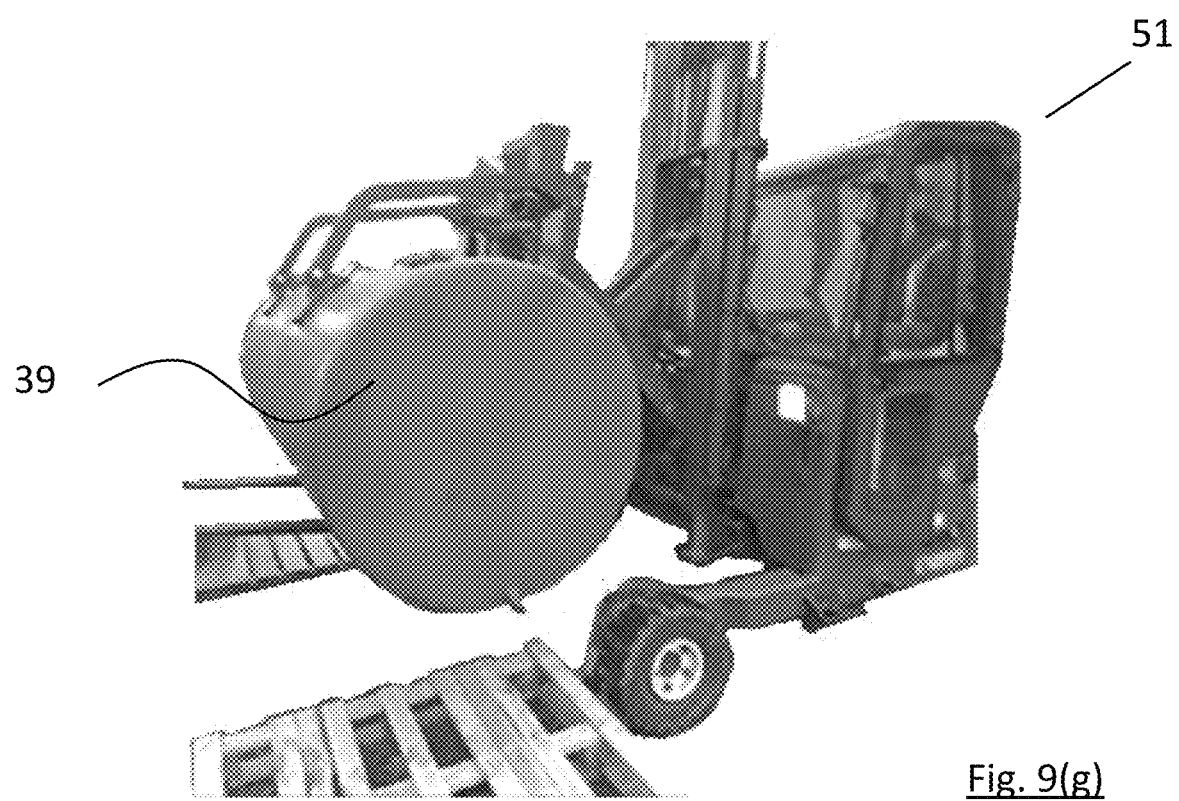
Figure 9H:
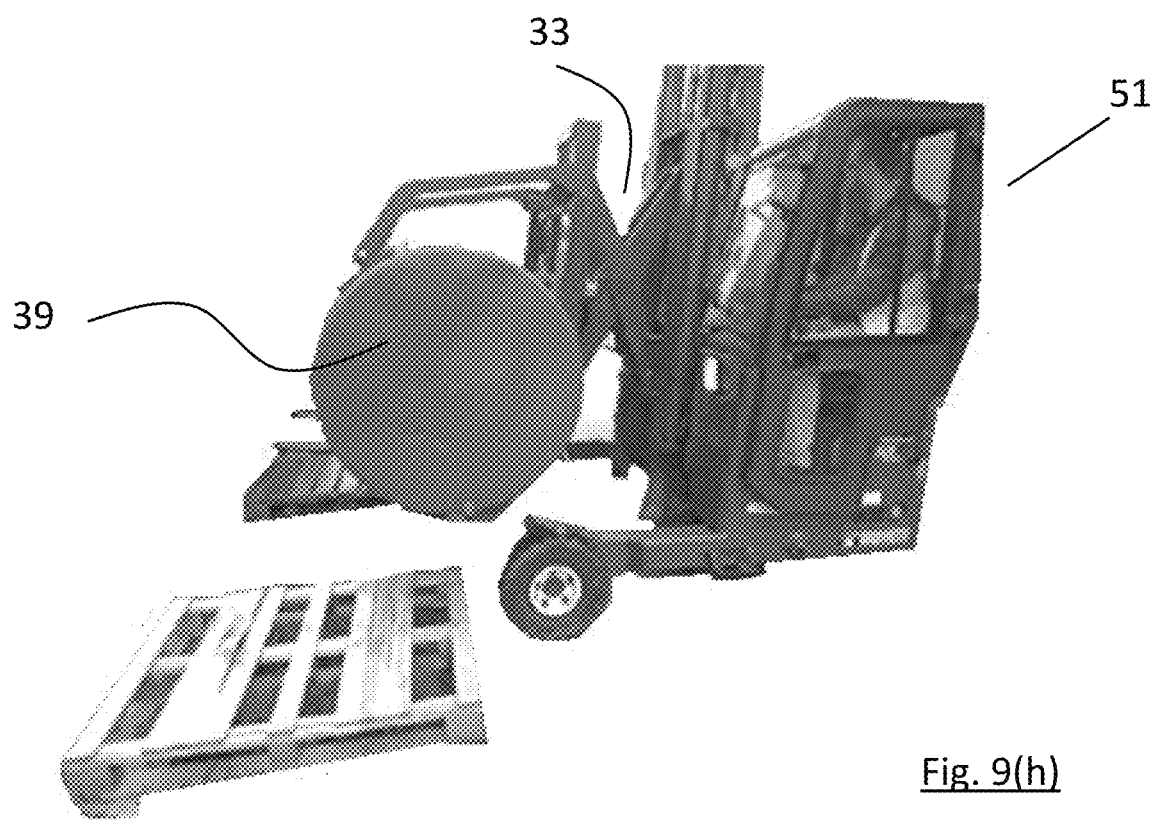
Figure 9I:
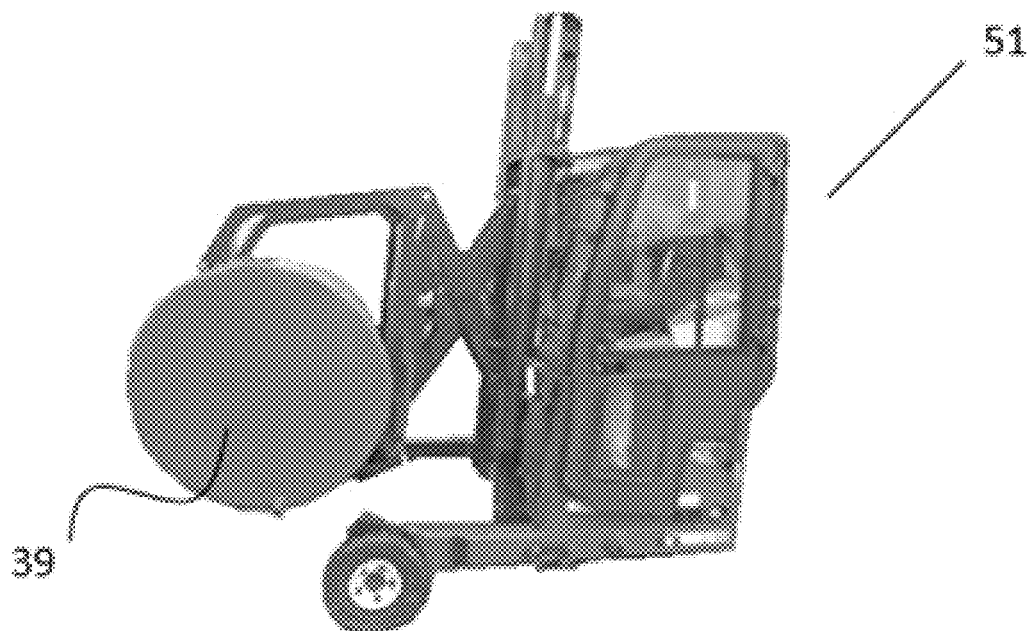

Referring now to FIG. 9(g), the forks have been raised further, lifting the gas tank 39 higher off the ground. In FIG. 9(h), the pantograph 33 attachment has been operated to draw the fork carriage rearwards towards the upright mast, and the gas tank is moved rearwardly, over the front wheels of the TMFL, towards the driver's station and the motive power unit. As will be understood, the TMFL will be more stable in operation with the weight of the gas tank more rearwardly on the TMFL. Ideally, the pantograph attachment 33 would be fully collapsed, bringing the gas tank as far rearwardly as possible before the forklift is driven off. Referring to FIG. 9(i), there is shown a view similar to FIG. 9(h) with the gas tank partially retracted towards the rear of the TMFL but from a more side-on view. It can be seen that the gas tank is partially over the TMFLs front wheels.

Figure 9J:
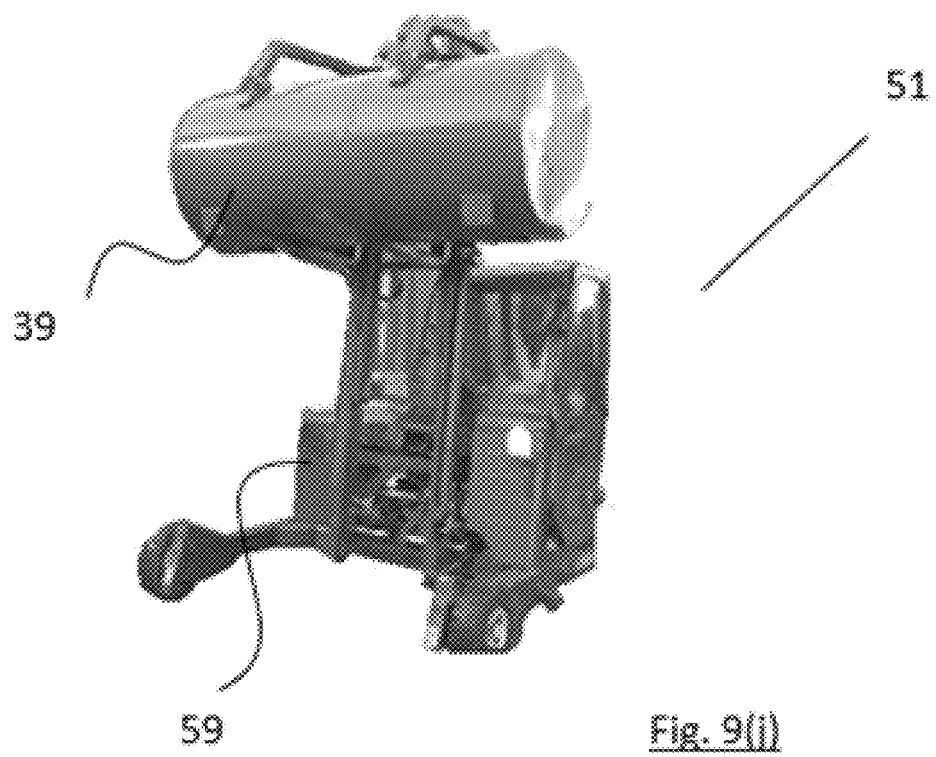

Referring now to FIG. 9(j), there is shown a view of the TMFL with the forks having been raised on the upright mast. It can be seen that the forklift with the gas tank handling attachment is able to reach the tank when it is located high up on a delivery vehicle. The operator will also have good visibility in front of the TMFL with the tank raised out of their line of site and this may be useful for accurate positioning. In the embodiments shown, the mast is a static mast however it will be understood that the mast could equally well be mounted on a carriage which in turn would be slidably mounted and moveable forwards and backwards on the U-shaped chassis.

FIGS. 9(a) to 9(i) illustrate the gas tank being mounted onto the gas tank handling attachment however it will be understood that the gas tank could be placed down in the desired location by simply reversing the steps.

Figure 10A:
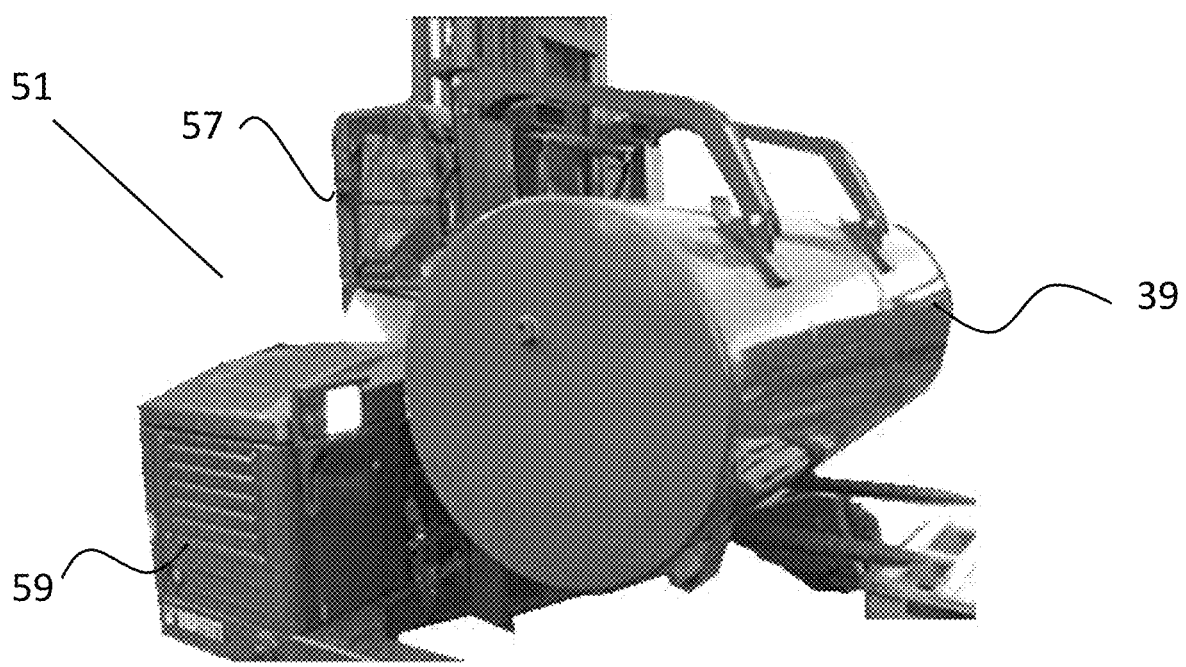
FIGS. 10(a) to 10(c) inclusive are photographs of a TMFL with the gas tank handling attachment according to the invention, in use, handling a gas tank, demonstrating tilt operation of the upright mast.
Figure 10B:
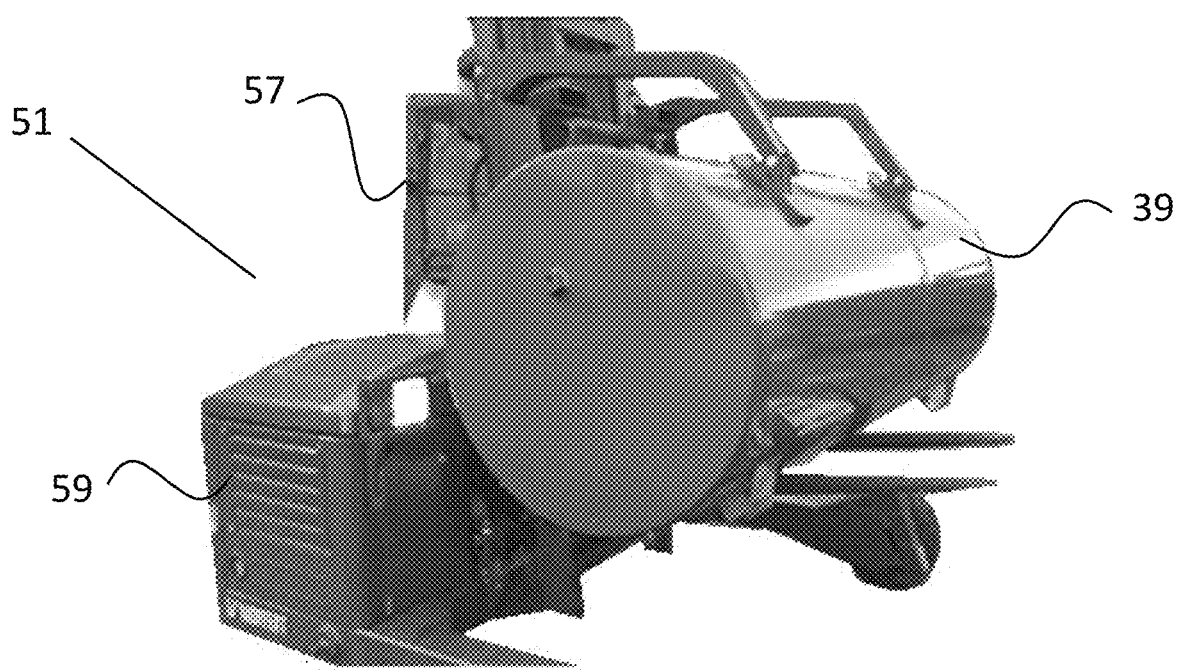
Figure 10C:
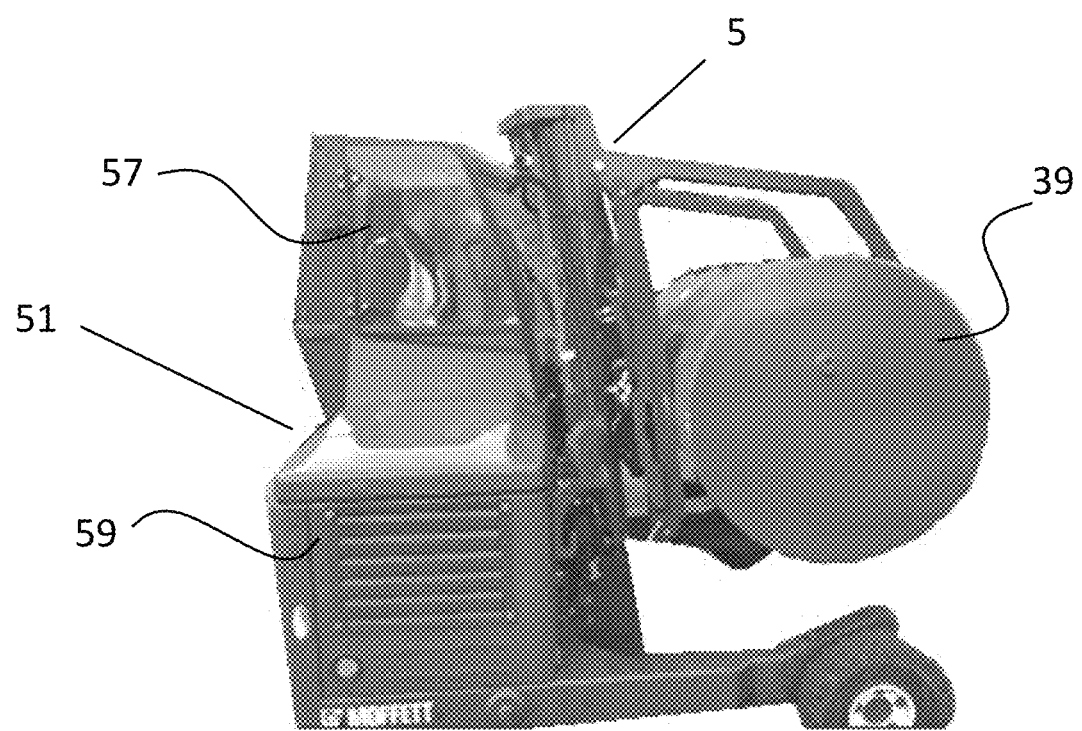

Referring now to FIGS. 10(a) to 10(c) inclusive, there is shown a plurality of views illustrating the tilt function of the upright mast. In FIG. 10(a), the gas tank has been lifted onto the tines and raised off the ground. In FIG. 10(b), the tilt ram has been operated to tilt the mast rearwards. This may be seen more clearly in FIG. 10(c). In FIG. 10(c), there is shown a side view of the TMFL with the gas tank mounted thereon and engaged by the gas tank handling attachment. It can be seen that the mast is tilted rearwards at an angle of the order of 7° and this will further stabilize the gas tank during movement of the lifting assembly and TMFL.

Figure 11A:
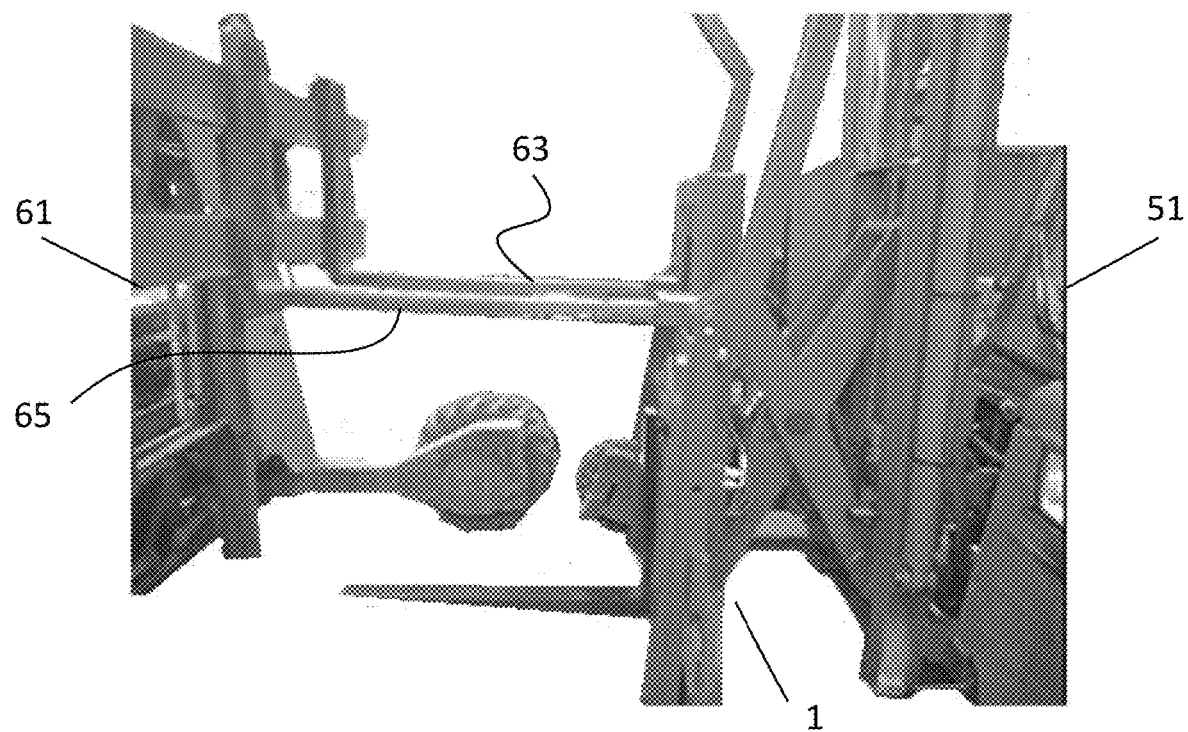
FIGS. 11(a) to 11(f) inclusive are photographs of the gas tank handling attachment according to the invention being removed from a TMFL.
Figure 11B:
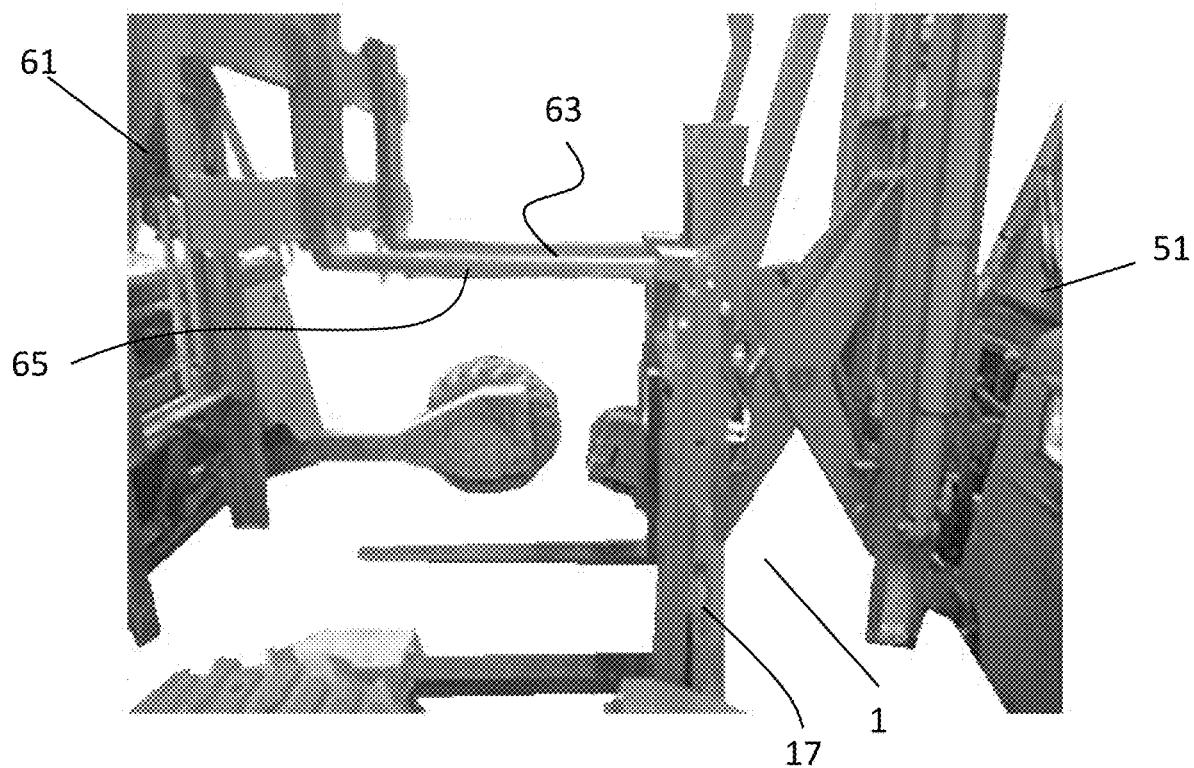

Referring now to FIGS. 11(a) to 11(f), there are shown a plurality of views illustrating the gas tank handling attachment being removed from the TMFL 51. In FIG. 11(a), another forklift 61 is driven up to the TMFL 51 and the tines 63, 65 of the second forklift are inserted into the fork pockets 53, 55 of the gas tank handling attachment. In FIG. 11(a), the forklift 61 and the tines 63, 65 are advanced further until the tines 63, 65 properly engage the fork pockets 53, 55. In FIG. 11(b), the quick hitch attachment lock 17 of the gas tank handling attachment 1 is released by the operator.

Figure 11C:
Figure 11D:
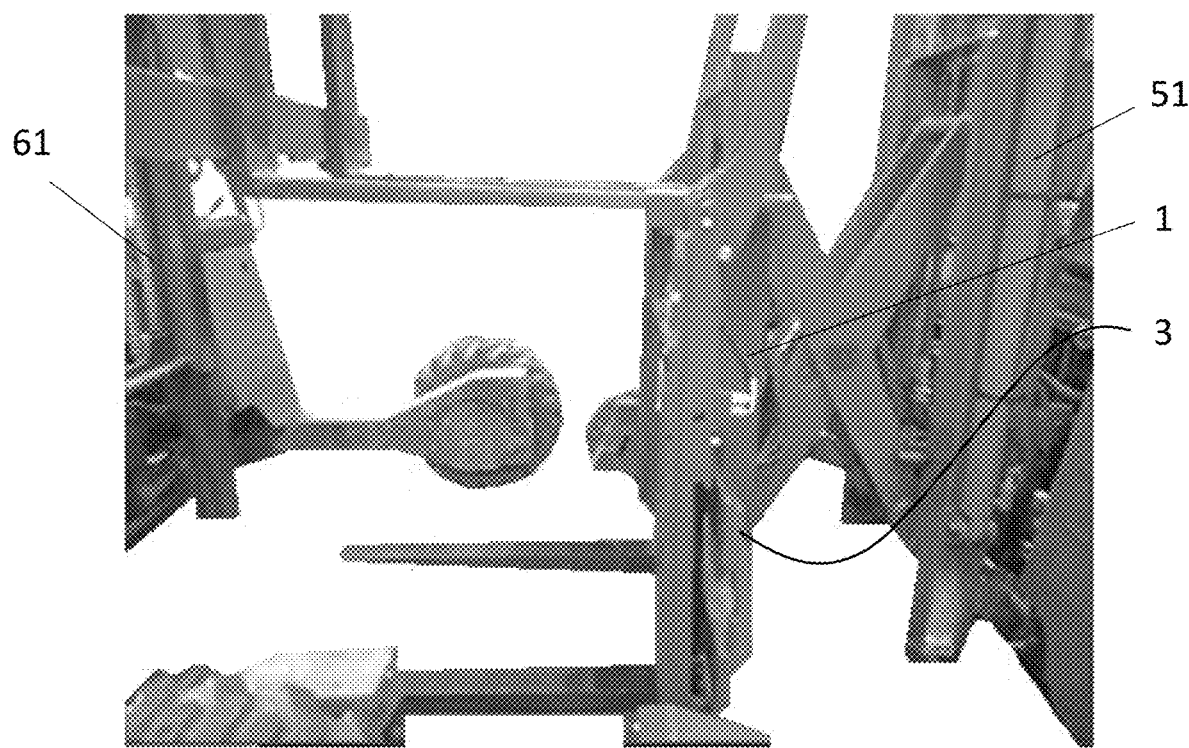
Figure 11E:
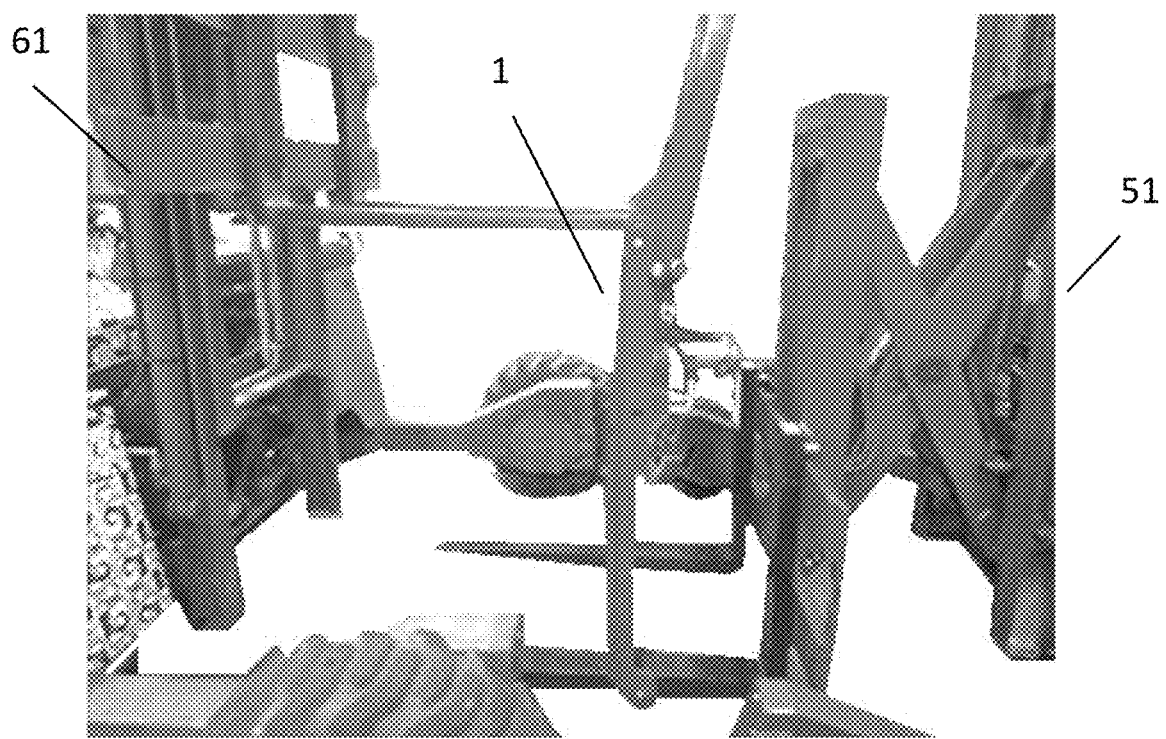
Figure 11F:
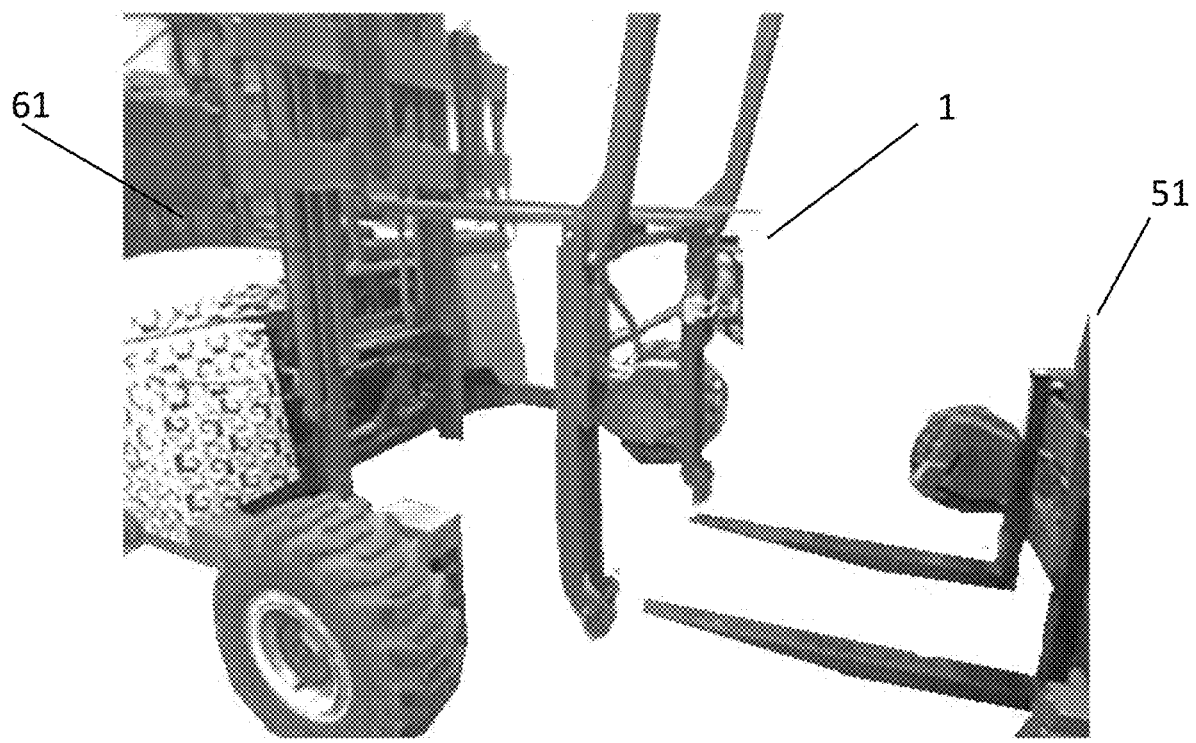

In FIG. 11(c), the operator of the second forklift 61 raises the forks 63, 65, thereby causing the gas tank handling attachment to be lifted up off the fork carriage 3. Once the gas tank handling attachment has been raised free of the fork carriage 3, the forklift 61 is reversed further to separate the gas tank handling attachment 1 from the fork carriage 3 and the TMFL 51, as illustrated in FIG. 11(d). In FIGS. 11(e) and 11(f), the forklift 61 has been reversed even further until the gas tank handling attachment 1 is shown completely free of the TMFL 51. It will be understood that instead of another forklift 61, a free-standing frame or other bracket could be used to engage the fork pockets 53, 55 of the gas tank handling attachment and the lifting assembly 5 of the TMFL 51 could be used to lower the fork carriage 3 and free the gas tank handling attachment 1 from the fork carriage 3.

It will be understood from the foregoing that a substantial advantage of the gas tank handling attachment is that it will allow for the TMFL to be mounted onto a truck without the need to remove the attachment. Additionally, the TMFL with the attachment mounted thereon can be used with a conventional pallet without having to remove the attachment. In other words, the attachment doesn't impede the normal operation of the TMFL. This is achieved at least in part by the pair of clamping arms pivotably mounted on the frame being able to pivot upwardly into a stowed configuration to a position rearward of the front face of the fork carriage (as seen for example in FIG. 9(a)). This in turn is made possible, at least in part, by the mounting configuration of the clamping arms and the manner in which the pivoting rams are configured. In the embodiments shown, the pivoting rams are located rearward of the clamping arm relative to the front-back direction of the forklift, in a position where they will not impede a load on the forks.

Throughout the specification, reference is made to an upright mast however it is conceivable that the invention could be applied to other mast arrangements such as a pivoting boom type arrangement or a telescopic mast. The mast may be a fixed upright mast or a sliding mast, mounted on a carriage for reciprocal movement forwards and backwards on the U-shaped chassis.

In this specification the terms "comprise, comprises, comprised and comprising" and the terms "include, includes, included and including" are all deemed interchangeable and should be afforded the widest possible scope and interpretation.

The invention is not solely limited to the embodiments hereinbefore described but may be varied in both construction and detail within the scope of the claims.

The invention claimed is:

1. A gas tank handling attachment for a truck mounted forklift truck (TMFL) comprising:
    a frame comprising a pair of spaced apart uprights bridged by at least one bracing cross-member therebetween, and means to releasably engage a fork carriage mounted on the frame;
    a pair of clamping arms pivotably mounted on the frame, one of which is mounted on the first of the pair of spaced apart uprights and the other of which is mounted on the second of the pair of spaced apart uprights, the pair of clamping arms being pivotable to and from a first stowed configuration in which the clamping arms are substantially parallel to and extend upwardly and rearwardly from the uprights and a second operating configuration in which the clamping arms are substantially orthogonal to and project forwardly from the uprights;
    a pair of pivoting rams mounted on the frame, one of the pivoting rams being operable to pivot the first clamping arm to and from the stowed configuration and the operating configuration, the other of the pivoting rams being operable to pivot the second clamping arm to and from the stowed configuration and the operating configuration.

2. A gas tank handling attachment as claimed in claim 1 in which each of the clamping arms is cranked intermediate a first end and a second end of the clamping arm in an elbow joint.

3. A gas tank handling attachment as claimed in claim 2 in which each of the clamping arms is provided with a clamping pad pivotably mounted at an outermost, free end remote from the frame.

4. A gas tank handling attachment as claimed in claim 1 in which each of the clamping arms is provided with a clamping pad pivotably mounted at an outermost, free end remote from the frame.

5. A gas tank handling attachment as claimed in claim 4 in which the clamping pad is substantially arcuate in shape.

6. A gas tank handling attachment as claimed in claim 5 in which the clamping pad is provided with a rubber cover for engagement of the gas tank.

7. A gas tank handling attachment as claimed in claim 1 in which the frame comprises a pair of tine pockets mounted on the bracing cross member.

8. A gas tank handling attachment as claimed in claim 1 in which the means to engage the fork carriage comprises a quick-hitch attachment.

9. A gas tank handling attachment as claimed in claim 1 in which the pivoting rams are hydraulic rams and in which the gas tank handling attachment comprises a hydraulic connector for receipt of and connection to a hydraulic supply and return feed of a TMFL.

10. A gas tank handling attachment as claimed in claim 9 in which there is provided a check valve on each of the pivoting rams.

11. A gas tank handling attachment as claimed in claim 9 in which there is provided a flow divider directly downstream of the hydraulic connector intermediate the hydraulic connector and the pivoting rams for controlling the supply of hydraulic fluid from the hydraulic supply feed to the pivoting rams.

12. A gas tank handling attachment as claimed in claim 11 in which there is provided a check valve on each of the pivoting rams.

13. A gas tank handling attachment as claimed in claim 1 in which there is provided a rubber pad on each of the uprights.

14. A gas tank handling attachment as claimed in claim 1 in which there are provided a pair of tine rubber pads, each of which is configured for mounting on a tine of a TMFL.

15. A TMFL comprising a u-shaped chassis having a pair of side bars bridged by a rear cross bar, a driver's station mounted on one of the side bars, a motive power unit mounted on the other side bar opposite the driver's station, and a lifting assembly mounted on the u-shaped chassis comprising a fork carriage and a pair of forks mounted on the fork carriage, means to extend and retract a reach of the forks, and in which there is provided a gas tank handling attachment comprising:
    a frame comprising a pair of spaced apart uprights bridged by at least one bracing cross-member therebetween, and means to releasably engage the fork carriage mounted on the frame;
    a pair of clamping arms pivotably mounted on the frame, one of which is mounted on the first of the pair of spaced apart uprights and the other of which is mounted on the second of the pair of spaced apart uprights, the pair of clamping arms being pivotable to and from a first stowed configuration in which the clamping arms are substantially parallel to and extend upwardly from the uprights and a second operating configuration in which the clamping arms are substantially orthogonal to and project forwardly from the uprights;
    a pair of pivoting rams mounted on the frame, one of the pivoting rams being operable to pivot the first clamping arm to and from the stowed configuration and the operating configuration, the other of the pivoting rams being operable to pivot the second clamping arm to and from the stowed configuration and the operating configuration, and in which the pair of clamping arms are configured to pivot upwardly into a stowed configuration to a position rearward of the front face of the fork carriage.

16. A TMFL as claimed in claim 15 in which the lifting assembly comprises a substantially upright mast and in which the fork carriage is configured for reciprocal movement upwards and downwards on the substantially upright mast.

17. A TMFL as claimed in claim 16 in which the substantially upright mast is pivotably mounted on the chassis and in which there is provided a tilt ram, one end of which is mounted on the chassis and the other end of which is connected to the substantially upright mast, operable to tilt the substantially upright mast.

18. A TMFL as claimed in claim 15 in which the means to extend and retract the reach of the forks comprises a pantograph device on which the fork carriage is mounted.

19. A TMFL as claimed in claim 15 in which there is provided a hydraulic supply feed for connection to a hydraulic connector of the gas tank handling attachment.

20. A TMFL as claimed in claim 15 in which there are provided controls internal the driver's station for operating the pivoting rams of the gas tank handling attachment.

\* \* \* \* \*